United States Patent
Lee et al.

(10) Patent No.: US 10,340,491 B2
(45) Date of Patent: Jul. 2, 2019

(54) METHOD FOR MANUFACTURING SEPARATION FILM AND THE SEPARATION FILM, AND BATTERY USING SAME

(71) Applicant: CHEIL INDUSTRIES INC., Gyeongsangbuk-do (KR)

(72) Inventors: Sang Ho Lee, Suwon-si (KR); Kee Wook Kim, Suwon-si (KR); Jung Seong Lee, Suwon-si (KR); Jung Sue Jang, Suwon-si (KR); Jun Ho Chung, Suwon-si (KR); Jae Hyun Cho, Suwon-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 318 days.

(21) Appl. No.: 14/764,912

(22) PCT Filed: Jan. 29, 2014

(86) PCT No.: PCT/KR2014/000878
§ 371 (c)(1),
(2) Date: Jul. 30, 2015

(87) PCT Pub. No.: WO2014/119941
PCT Pub. Date: Aug. 7, 2014

(65) Prior Publication Data
US 2015/0380705 A1    Dec. 31, 2015

(30) Foreign Application Priority Data
Jan. 31, 2013   (KR) .................. 10-2013-0010817

(51) Int. Cl.
*H01M 2/16*    (2006.01)
*B29C 48/00*   (2019.01)
(Continued)

(52) U.S. Cl.
CPC ....... *H01M 2/1653* (2013.01); *B29C 48/0018* (2019.02); *C08J 5/18* (2013.01);
(Continued)

(58) Field of Classification Search
CPC ........... H01M 2/14; H01M 2/16; H01M 2/166
See application file for complete search history.

(56) References Cited

U.S. PATENT DOCUMENTS

| | | | |
|---|---|---|---|
| 2005/0112462 A1* | 5/2005 | Marple | H01M 2/0225 429/209 |
| 2010/0009265 A1* | 1/2010 | Hatayama | B01D 71/26 429/254 |

(Continued)

FOREIGN PATENT DOCUMENTS

| | | |
|---|---|---|
| CN | 101983219 A | 3/2011 |
| CN | 102215944 A | 10/2011 |

(Continued)

*Primary Examiner* — Jeremiah R Smith
(74) *Attorney, Agent, or Firm* — Lee & Morse, P.C.

(57) ABSTRACT

The present invention relates to a method for manufacturing a separator in which the tensile strength is enhanced and melt shrinkage is reduced by controlling elongation step from among the manufacturing steps thereof. Additionally, the present invention relates to a separator having superb winding processability as well as superb thermal stability due to the raised the tensile strength while maintaining a low rate of melt shrinkage. Furthermore, the present invention relates to an electrochemical battery having enhanced stability by utilizing a separator having high tensile strength and a low rate of melt shrinkage.

10 Claims, 1 Drawing Sheet

(51) Int. Cl.

| | | |
|---|---|---|
| *C08J 5/18* | (2006.01) | |
| *H01M 10/0525* | (2010.01) | |
| *H01M 2/14* | (2006.01) | |
| *H01M 10/052* | (2010.01) | |
| *B29K 23/00* | (2006.01) | |
| *B29L 31/34* | (2006.01) | |
| *B29L 31/00* | (2006.01) | |
| *B29C 48/08* | (2019.01) | |

(52) U.S. Cl.
 CPC ......... *H01M 10/0525* (2013.01); *B29C 48/08* (2019.02); *B29K 2023/00* (2013.01); *B29L 2031/3468* (2013.01); *B29L 2031/7146* (2013.01); *C08J 2323/06* (2013.01); *C08J 2423/06* (2013.01); *H01M 2/14* (2013.01); *H01M 2/16* (2013.01); *H01M 2/166* (2013.01); *H01M 2/1686* (2013.01); *H01M 10/052* (2013.01)

(56) References Cited

U.S. PATENT DOCUMENTS

| | | | | |
|---|---|---|---|---|
| 2010/0112432 A1* | 5/2010 | Nishida | ............... | H01M 2/1653 429/144 |
| 2010/0297491 A1* | 11/2010 | Ishihara | ............... | B01D 69/125 429/145 |
| 2012/0070644 A1* | 3/2012 | Kang | ..................... | B01D 69/02 428/220 |
| 2012/0164538 A1* | 6/2012 | Inagaki | ............... | H01M 2/1653 429/249 |
| 2012/0301698 A1* | 11/2012 | Rhee | ......................... | B32B 7/02 428/220 |
| 2013/0021719 A1* | 1/2013 | Busch | ................. | B29C 47/0021 361/502 |
| 2013/0040184 A1* | 2/2013 | Busch | ................... | B29C 55/005 429/144 |
| 2013/0209892 A1* | 8/2013 | Ogawa | .................. | B29C 55/005 429/249 |
| 2014/0045033 A1* | 2/2014 | Zhang | ................ | H01M 2/1686 429/145 |

FOREIGN PATENT DOCUMENTS

| | | |
|---|---|---|
| CN | 102215945 A | 10/2011 |
| CN | 102257048 A | 11/2011 |
| CN | 102439760 A | 5/2012 |
| CN | 102740956 A | 10/2012 |
| JP | 2001-019785 | 1/2001 |
| JP | 2005-343958 A | 12/2005 |
| JP | 2007-513474 A | 5/2007 |
| JP | 2008-270178 A | 11/2008 |
| JP | 2009-001817 A | 1/2009 |
| JP | 2009-132904 A | 6/2009 |
| JP | 2009-269941 | 11/2009 |
| JP | 2010-538097 A | 12/2010 |
| JP | 2010-540692 A | 12/2010 |
| JP | 2012-109249 A | 6/2012 |
| JP | 2012-522669 A | 9/2012 |
| KR | 10-2001-0042783 | 5/2001 |
| KR | 10-2001-0042791 | 5/2001 |
| KR | 10-2006-0118135 | 11/2006 |
| KR | 10-2006-0121802 | 11/2006 |
| KR | 10-0667052 | 1/2007 |
| KR | 10-0893226 B1 | 4/2009 |
| KR | 10-2010-0099405 A | 9/2010 |
| KR | 10-2010-0111065 A | 10/2010 |
| KR | 10-2012-0046101 | 5/2012 |
| KR | 10-1174995 B1 | 8/2012 |
| WO | WO 2011076375 * | 6/2011 ............... H01G 9/00 |

* cited by examiner

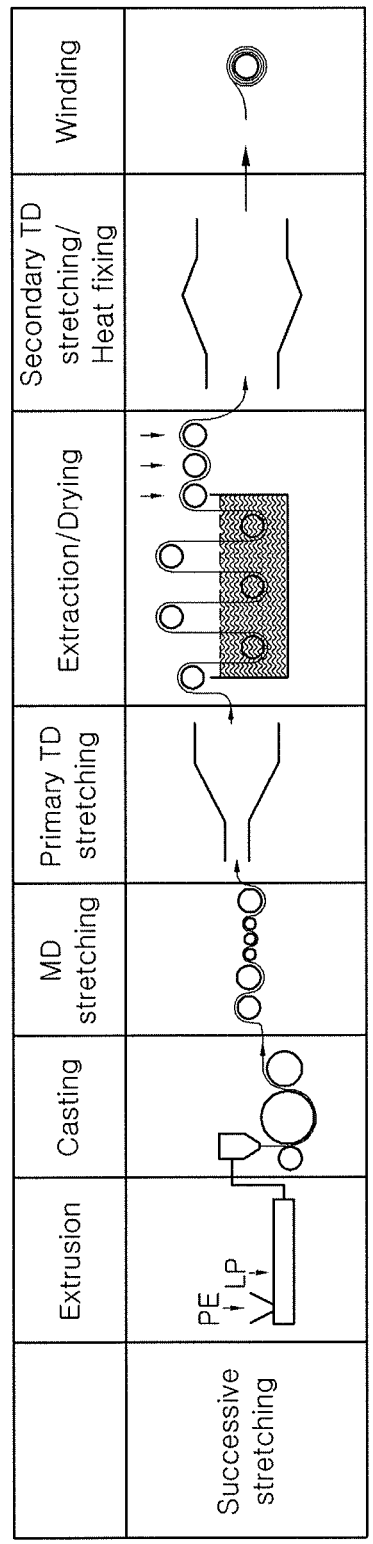

METHOD FOR MANUFACTURING SEPARATION FILM AND THE SEPARATION FILM, AND BATTERY USING SAME

CROSS REFERENCE TO RELATED APPLICATIONS

This is the U.S. national phase application based on PCT Application No. PCT/KR2014/000878, filed Jan. 29, 2014, which is based on Korean Patent Application No. 10-2013-0010817, filed Jan. 31, 2013, the entire contents of all of which are hereby incorporated by reference.

TECHNICAL FIELD

The present invention relates to a method for manufacturing a separator for electrochemical batteries and a separator manufactured by the same. In addition, the present invention relates to an electrochemical battery including the same.

BACKGROUND ART

A separator for electrochemical batteries refers to an intermediate membrane that isolates a cathode and an anode from each other in a battery while maintaining ionic conductivity, thereby enabling charge/discharge of the battery.

Recently, along with a trend of pursuing light weight and miniaturization of electrochemical batteries to improve portability of electronic equipment, there is a need for high-power high-capacity batteries for electric vehicles. Thus, a separator for batteries is required to have reduced thickness and weight as well as excellent dimensional stability under heat and high tension so as to improve productivity of high-capacity batteries. In addition, recently, the separator is required to have not only permeability and thermal shrinkage resistance, but also properties for increasing lifespan of the batteries such as cycle characteristics, or properties for improving productivity of the batteries such as injection of an electrolyte.

In manufacture of batteries, a winding process takes a substantial time and must be performed at high speed in order to improve productivity of the batteries. In order to prevent process failure due to fracture of a separator during high speed winding, various studies have been made to develop a separator having high tensile strength.

As an example of well-known techniques for improving tensile strength of the separator, Korean Patent Publication No. 10-0943235 B discloses a method wherein a high-density polyethylene composition, a molecular weight of which is regulated at a specific high level, is used in manufacture of a base film for separators, thereby providing a separator having enhanced physical strength. However, this method has a limit in that components of a base film are restricted to specific materials, and also has a problem in that the method cannot be applied to various base films. Moreover, this method has a problem of deterioration in heat resistance due to increase in melt shrinkage of the separator despite increase in tensile strength.

Therefore, there is need for a method that can increase tensile strength of a separator based on physical approaches so as to be applied to various base films, instead of simply changing a chemical composition of a base film to increase tensile strength as in the related art, and for development of a separator having high tensile strength and low melt shrinkage to provide good heat resistance.

DISCLOSURE

Technical Problem

It is one aspect of the present invention to a method for manufacturing a separator, which can improve tensile strength of the separator while reducing melt shrinkage through regulation of a stretching process.

It is another aspect of the present invention to provide a separator which has not only good winding processability but also good thermal stability by improving tensile strength while maintaining low melt shrinkage.

It is a further aspect of the present invention to provide an electrochemical battery which exhibits enhanced dimensional stability using a separator exhibiting high tensile strength and low melt shrinkage.

Technical Solution

Exemplary embodiments of the present invention provide a separator which has high tensile strength and low melt shrinkage through regulation of a stretching process in a method of manufacturing a separator.

Specifically, in accordance with one aspect of the present invention, there is provided a polyolefin separator, wherein a ratio (b/a) of TD melt shrinkage (b) of the separator to MD melt shrinkage (a) thereof is 1.2 or less, as measured in accordance with thermomechanical analysis (TMA).

In accordance with another aspect of the present invention, there is provided a method for manufacturing a polyolefin separator, which includes: subjecting a separator to MD stretching and TD stretching, and subjecting the separator to transverse relaxation to remove stress from the separator subjected to the TD stretching, wherein the TD stretching comprises primary TD stretching and secondary TD stretching, and is performed such that the separator subjected to the secondary TD stretching has a transverse width of 1.1 L or more and the transverse relaxation is performed such that the separator subjected to the transverse relaxation has a transverse width of 0.9 L to less than 1.3 L, where L is a transverse width of the separator subjected to the primary TD stretching.

In accordance with a further aspect of the present invention, there is provided an electrochemical battery including a cathode, an anode, a separator, and an electrolyte, wherein the separator is the polyolefin separator as set forth herein.

Advantageous Effects

According to one exemplary embodiment of the invention, a separator has high tensile strength and low melt shrinkage, thereby securing excellent winding processability while exhibiting excellent thermal stability in use of the separator.

DESCRIPTION OF DRAWINGS

FIG. 1 is a diagram illustrating a method for manufacturing a separator according to one exemplary embodiment of the present invention in sequence.

BEST MODE

Hereinafter, exemplary embodiments of the present invention will be described in more detail. A description of details apparent to those skilled in the art will be omitted.

A method for manufacturing a separator according to one exemplary embodiment of the invention will be described in more detail with reference to FIG. 1. FIG. 1 is a diagram illustrating a method for manufacturing a separator according to one exemplary embodiment of the present invention in sequence.

Referring to FIG. 1, the method for manufacturing a separator according to the exemplary embodiment includes: introducing a base film composition and a diluent into an extruder, followed by extrusion; casting the extruded product having a gel phase into a sheet; subjecting the sheet to MD stretching in a machine direction (MD); subjecting the sheet to primary TD stretching in a transverse direction (TD); extracting the diluent from the sheet subjected to primary TD stretching, followed by drying the sheet; subjecting the dried sheet to heat setting through secondary TD stretching and transverse relaxation. The method may further include winding the sheet subjected to heat setting. The method for manufacturing a separator according to the exemplary embodiment can provide a separator which has high tensile strength and low melt shrinkage through regulation of a stretching process.

Extrusion and Casting (Film Forming) Process

A composition including a polyolefin resin and a diluent is sequentially subjected to melt-kneading, extrusion, and cooling to form a solidified sheet. As a process for melt-kneading the composition including the polyolefin resin and the diluent, any method well known in the art may be used.

Specifically, the polyolefin resin and the diluent may be melt-kneaded at a temperature of 100° C. to 250° C., and subjected to extrusion in a twin-screw extruder at a temperature of 150° C. to 250° C., followed by cooling using a casting roll at 20° C. to 80° C. or forcible cooling using cold air sprayed from an air-knife to crystalize a film, thereby forming a solidified sheet. The cold air sprayed from the air-knife may have a temperature of −20° C. to 80° C.

The polyolefin resin may include at least one selected from the group consisting of ultra-high molecular weight polyethylene, high molecular weight polyethylene, high density polyethylene, low density polyethylene, linear low density polyethylene, polypropylene, high crystallinity polypropylene, and polyethylene-propylene copolymers. The high density polyethylene may have a viscosity average molecular weight (Mv) of $1\times10^5$ to $9\times10^5$ g/mol, for example, $3\times10^5$ to $6\times10^5$ g/mol. The ultra-high molecular weight polyethylene may have a viscosity average molecular weight of $9\times10^5$ or more, specifically $9\times10^5$ to $5\times10^6$ g/mol. For example, the high density polyethylene may be used alone, the ultra-high molecular weight polyethylene may be used alone, or both the high density polyethylene and the ultra-high molecular weight polyethylene may be used in combination. More specifically, the ultra-high molecular weight polyethylene may be used in an amount of 30% by weight (wt %) or less based on the weight of the polymer resin. For example, the polymer resin including 70 wt % or more of a high density polyethylene having a viscosity average molecular weight of $1\times10^5$ to $9\times10^5$ g/mol and 30 wt % or less of a ultra-high molecular weight polyethylene having a viscosity average molecular weight of $9\times10^5$ g/mol or more may be used. The polymer resin is advantageous in manufacture of a high strength separator. In addition, when two kinds of polymer resins are used, these resins may be mixed using at least one selected from the group consisting of a Henschel mixer, a Banbury mixer, and a planetary mixer. Examples of the resin other than polyolefin resins may include polyamide (PA), polybutylene terephthalate (PBT), polyethylene terephthalate (PET), polychlorotrifluoroethylene (PCTFE), polyoxymethylene (POM), polyvinyl fluoride (PVF), polyvinylidene fluoride (PVdF), polycarbonate (PC), polyarylate (PAR), polysulfone (PSF), and polyetherimide (PEI), without being limited thereto. These resins may be used alone or in combination thereof.

In addition, the composition including the polyolefin resin and the diluent may further include an inorganic material. Examples of the inorganic material may include alumina, calcium carbonate, silica, barium sulfate, and talc, without being limited thereto, and these inorganic materials may be used alone or as a mixture thereof.

The diluent is not particularly limited and may be any organic compound that can form a single phase with the polyolefin resin (or the mixture of the polyolefin resin and the resin other than polyolefin resins) at an extrusion temperature. Examples of the diluent may include aliphatic or cyclic hydrocarbons such as nonane, decane, decalin, fluid paraffin (or paraffin oil) such as liquid paraffin (LP), and paraffin wax; phthalate esters such as dibutyl phthalate, dioctyl phthalate; $C_{10}$ to $C_{20}$ fatty acids such as palmitic acid, stearic acid, oleic acid, linoleic acid, and linolenic acid; and $C_{10}$ to $C_{20}$ fatty alcohols such as palmitic alcohol, stearic alcohol, and oleic alcohol, without being limited thereto. These compounds may be used alone or in combination thereof.

For example, the diluent may be fluid paraffin. Since liquid paraffin is harmless to humans, has a high boiling point and a low content of volatile components, the liquid paraffin is suitable for use as the diluent in a wet process. The diluent may be present in an amount of 20 wt % to 90 wt %, specifically 30 wt % to 90 wt %, based on the total weight of the composition including the polyolefin resin and the diluent.

Stretching Process (MD Stretching and Primary TD Stretching)

Next, the solidified sheet is stretched. In the method for manufacturing a separator according to the exemplary embodiment of the invention, since the stretching process is performed before extraction of the diluent, the stretching process can be more easily performed due to softening of the polyolefin by the diluent, thereby improving productivity. In addition, the thickness of the sheet is reduced by stretching, thereby allowing easy removal of the diluent from the sheet after stretching.

Specifically, the solidified sheet may be stretched in the machine direction (MD) and/or in the transverse direction (TD), such as in one of the machine direction or the transverse direction (uniaxial stretching), and both in the machine direction and in the transverse direction (biaxial stretching). Further, in biaxial stretching, the solidified sheet may be stretched in the machine direction and the transverse direction at the same time, or may be initially stretched in the machine direction (or transverse direction) and then stretched in the transverse direction (or machine direction).

For example, the stretching process may be performed by biaxial stretching. Specifically, according to one exemplary embodiment, the stretching process may be performed by two step biaxial stretching. Two step biaxial stretching enables easier regulation of stretching factor in the machine direction and the transverse direction. Specifically, two step biaxial stretching includes stretching the sheet at temperature $T_1$ in the machine direction, followed by stretching the sheet at temperature $T_2$ in the transverse direction. Here, the MD stretching temperature and the TD stretching temperature may range from 90° C. to 130° C. For example, the TD stretching temperature $T_2$ may be the same or different from the MD stretching temperature $T_1$. In one exemplary embodiment, the TD stretching temperature may be higher than the MD stretching temperature. Specifically, MD stretching may be performed at a temperature of 90° C. to 120° C., followed by TD stretching at a temperature of 100° C. to 130° C. When TD stretching is performed at a 10° C. or higher temperature than MD stretching, it is effective in terms of stretching and improvement in physical properties.

Stretching factors in the machine direction and the transverse direction may be independently 4 to 10 times. Specifically, the MD stretching factor may be 4 to 8 times and the TD stretching factor may be 4 to 8 times. The MD stretching factor and the TD stretching factor may be the same or different from each other. A ratio of TD stretching factor $L_2$ to MD stretching factor $L_1$ may range from 1.1 to 1.8, specifically from 1.2 to 1.7. Within this range of the stretching factor ratio, the separator can have improved thermal stability by reducing a difference between MD shrinkage and TD shrinkage.

Diluent Extraction and Drying Process

Next, the diluent may be removed from the stretched sheet, which in turn is subjected to drying. Specifically, the film having been subjected to MD stretching and primary TD stretching may be dipped in an organic solvent to extract the diluent, followed by drying using an air-knife. Examples of the organic solvent may include, but are not limited to, halogenated hydrocarbons such as methylene chloride, 1,1,1-trichloroethane, and fluorocarbons; hydrocarbons such as n-hexane and cyclohexane; alcohols such as ethanol and isopropanol; and ketones such as acetone, methyl ethyl ketone and 2-butanone, without being limited thereto. When fluid paraffin is used as the diluent, methylene chloride may be used as the organic solvent. Since most organic solvents used in diluent extraction are highly volatile and toxic, water may be used to suppress volatilization of the organic solvent, as needed.

According to one exemplary embodiment, secondary TD stretching may be performed after extraction of the diluent. After secondary TD stretching of the sheet, the sheet may be subjected to transverse relaxation in order to reduce thermal shrinkage of a final sheet by removing residual stress of the dried sheet. Tensile strength and shrinkage ratio of the separator may be regulated through a heat setting process including secondary TD stretching and transverse relaxation.

Next, the heat setting process including secondary TD stretching and transverse relaxation will be described in more detail.

Secondary TD Stretching and Transverse Relaxation (Heat Setting)

Upon secondary TD stretching, the separator may be stretched in the transverse direction to have a transverse width of 1.1 L or more, specifically 1.1 L to 1.8 L, more specifically 1.1 L to 1.5 L, where L indicates a transverse width of the separator subjected to primary TD stretching.

In addition, the separator subjected to secondary TD stretching may be subjected to transverse relaxation to have a transverse width of 0.9 L to less than 1.3 L, for example, 0.9 L to 1.2 L, where L indicates the transverse width of the separator after primary TD stretching. Within this range, the separator can have improved tensile strength and low melt shrinkage to enhance thermal resistance of the separator. Upon secondary TD stretching, TD stretching and/or transverse relaxation may be properly repeated more than once depending upon desired tensile strength and melt shrinkage of the separator.

Secondary TD stretching may be performed in a suitable temperature range, and the separator may have various properties depending upon the temperature at which secondary TD stretching is performed. Secondary TD stretching and/or transverse relaxation (heat setting) may be performed at a temperature of 110° C. to 140° C. Within this temperature range, it is possible to achieve effective removal of residual stress from the film while improving properties of the film.

Another exemplary embodiment of the present invention provides a separator manufactured by the method according to the exemplary embodiment.

The separator manufactured by the method according to the exemplary embodiment may have a ratio (b/a) of TD melt shrinkage (b) to MD melt shrinkage (a) of 1.2 or less as measured in accordance with TMA. Further, according to a further exemplary embodiment, the separator may have an MD melt shrinkage of 10% to 35%, specifically 15% to 30%, more specifically 20% to 30%. Further, according to yet another exemplary embodiment, the separator may have a TD melt shrinkage of 5% to 35%, specifically 10% to 35%, more specifically 20% to 35%.

Within this range, the separator can have good thermal resistance and endure a substantially high temperature instead of being melted even when a battery manufactured using the separator is overheated, thereby preventing short circuit of electrodes or explosion of the battery.

The melt shrinkage of the separator may be measured by any typical method used in the art. By way of example, the melt shrinkage of the separator may be measured by the following method. The manufactured separator is cut into a rectangular shape having a size of 10 mm×80 mm (length (MD)×width (TD)) at 10 different regions to obtain 10 specimens. Then, with each of the specimens mounted on a TMA apparatus, a ratio of length of the specimen subjected to melt shrinkage to initial length of the specimen is measured by measuring length variation of each specimen while heating the specimen from room temperature (about 20° C.) to about 200° C. at a temperature increase rate of 10° C./min under a load of 0.005 N, followed by averaging the obtained values.

The separator according to the exemplary embodiment may have a tensile strength of 1,500 kgf/cm$^2$ or more both in the MD and in the TD, specifically an MD tensile strength of 1,800 kgf/cm$^2$ or more and a TD tensile strength of 1,500 kgf/cm$^2$ or more. Further, the separator may have a ratio (y/x) of TD tensile strength (y) to MD tensile strength (x) of 0.7 to 1.

When there is a substantial difference between the MD tensile strength and the TD tensile strength, the separator suffers from deterioration in stability. Specifically, when the separator has a significant difference between the MD tensile strength and the TD tensile strength, melt shrinkage and/or thermal shrinkage of the separator can be increased, and puncture strength of the separator can be reduced, thereby deteriorating thermal resistance and physical strength of the separator. Therefore, the present invention is aimed at providing a separator that has improved stability by securing similar tensile strength both in the MD and in the TD by adjusting the process of secondary TD stretching in manufacture of the separator.

Tensile strength of the separator may be measured by any method typically used in the art. By way of example, the tensile strength of the separator may be measured by the following method. The manufactured separator is cut into a rectangular shape having a size of 10 mm×50 mm (length (MD)×width (TD)) at 10 different regions to obtain 10 specimens. Then, each of the specimens is mounted on a tensile tester UTM and gripped to have a length of 20 mm, followed by measurement of average tensile strength in the machine direction and the transverse direction while applying a pulling force to the specimen.

Further, the separator according to the exemplary embodiment may have an air permeability of 350 sec/100 cc or less, specifically 340 sec/100 cc or less. Within this range of air permeability, the separator can have sufficient electrolyte wettability, thereby securing battery stability.

Air permeability of the separator can be measured by any method without limitation. The air permeability of the separator may be measured by any method typically used in the art. By way of example, the air permeability of the separator may be measured by the following method. The manufactured separator is cut at 10 different regions to obtain 10 specimens. Then, average time for a circular area of the separator having a diameter of 1 inch to transmit 100 cc of air is measured five times for each specimen using an air permeability measuring instrument (Asahi Seiko Co., Ltd.), followed by averaging to find air permeability.

Further, the separator according to the exemplary embodiment may have a puncture strength of 700 gf or more, specifically 700 gf to 800 gf, for example, 700 gf to 750 gf. Puncture strength of the separator may be measured by any method without limitation.

The puncture strength of the separator may be measured by any method typically used in the art. By way of example, the puncture strength of the separator may be measured by the following method. The manufactured separator is cut into a size of 50 mm×50 mm (length (MD)×width (TD)) at 10 different regions to obtain 10 specimens. Then, each of the specimens is placed over a hole having a diameter of 10 cm on a tester G5 (Kato Tech. Co., Ltd), followed by measuring puncturing force three times for each specimen while pressing down using a probe having a diameter of 1 mm and then averaging the obtained puncturing force values.

Further, the separator according to the exemplary embodiment of the invention may have a thermal shrinkage of less than 4% both in the MD and in the TD, as measured after being left at 105° C. for 1 hour. Specifically, the separator may have an MD thermal shrinkage of 3% or less and a TD thermal shrinkage of 2% or less, for example, a TD thermal shrinkage of 2% or less.

Within this range, the separator has high resistance to thermal shrinkage and a battery using the separator can have improved shape maintenance and stability.

The thermal shrinkage of the separator may be measured by any method typically used in the art. By way of example, the thermal shrinkage of the separator may be measured by the following method. The manufactured separator is cut into a size of 50 mm×50 mm (length (MD)×width (TD)) at 10 different regions to obtain 10 specimens. Then, each of the specimens is left in an oven at 105° C. for 1 hour, followed by measuring the degree of shrinkage in the MD and in the TD, and then calculating average thermal shrinkage.

In accordance with yet another exemplary embodiment of the present invention, there is provided a polyolefin coating separator that includes a polyolefin film; and a coating layer formed on one or both surfaces of the polyolefin film.

The coating layer may be formed of a coating composition, which may include an organic binder, inorganic particles, and a solvent.

The polyolefin film may be the polyolefin separator disclosed herein or manufactured by the method according to embodiments of the present invention.

Specifically, the organic binder may include at least one selected from the group consisting of polyvinylidene fluoride (PVdF) homopolymer, polyvinylidene fluoride-hexafluoropropylene (PVdF-HFP) copolymer, polymethyl methacrylate, polyacrylonitrile, polyvinyl pyrrolidone, polyvinyl acetate, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxyl methyl cellulose, acrylonitrile-styrene-butadiene copolymer, and mixtures thereof. Specifically, for example, a PVdF-based binder may be used as the organic binder. The PVdF-based binder may have a weigh average molecular weight (Mw) of 500,000 to 1,500,000 (g/mol), and a mixture of two or more PVdF-based binders having different weight average molecular weights may be used as the organic binder. For example, a mixture of at least one PVdF-based binder having a weight average molecular weight of 1,000,000 g/mol or less and at least one PVdF-based binder having a weight average molecular weight of 1,000,000 g/mol or more may be used. The PVdF-based binder having a weight average molecular weight within this range improves adhesive strength between the coating layer and the polyolefin base film, thereby effectively preventing the polyolefin base film vulnerable to heat from shrinking due to heat and enabling manufacture of a separator having improved electrolyte wettability. As a result, it is possible to manufacture batteries securing efficient output of electricity using the separator.

As the inorganic particles according to the present invention, any typical inorganic particles used in the art may be used without limitation. Examples of the inorganic particles may include $Al_2O_3$, $SiO_2$, $B_2O_3$, $Ga_2O_3$, $TiO_2$ or $SnO_2$ particles. These inorganic particles may be used alone or in combination thereof. For example, the inorganic particles may be $Al_2O_3$ (alumina) particles.

The inorganic particles according to the present invention may have an average particle diameter of 1 nm to 2,000 nm, for example, 100 nm to 1,000 nm, without being limited thereto. Within this range, it is possible to prevent deterioration in coating processability and dispersion of the inorganic particles in the coating liquid and to prevent deterioration in physical properties and increase in electric resistance by allowing suitable regulation of the thickness of the coating layer. Further, the size of pores generated in the separator can be properly regulated, thereby reducing a possibility of internal short circuit upon charge/discharge of batteries.

In preparation of the coating composition, the inorganic particles may be used in the form of inorganic dispersion in which the inorganic particles are dispersed in a suitable solvent. The suitable solvent may be any solvent typically used in the art. The solvent for dispersion of the inorganic particles may include, for example, acetone.

In the coating layer, the inorganic particles may be present in an amount of 70 wt % to 95 wt %, specifically 75 wt % to 90 wt %, more specifically 80 wt % to 90 wt %, based on the total weight of the coating layer. Within this range, the inorganic particles can secure sufficient heat dissipation and effectively suppress the thermal shrinkage of the separator coated with the coating composition containing the inorganic particles.

According to the present invention, examples of the solvent may include dimethyl formamide, dimethyl sulfoxide, dimethyl acetamide, dimethyl carbonate and N-methylpyrrolidone, without being limited thereto. In the coating composition, the solvent may be present in an amount of 20 wt % to 99 wt %, specifically 50 wt % to 95 wt %, more specifically 70 wt % to 95 wt %. Within this range, the solvent can facilitate preparation of the coating agent while allowing efficient drying of the coating layer.

In accordance with yet another exemplary embodiment of the present invention, a method for manufacturing a coating separator includes: preparing a coating composition including an organic binder, inorganic particles and a solvent; forming a coating layer on one or both surfaces of the polyolefin base film as set forth herein with the coating composition.

In accordance with yet another exemplary embodiment of the invention, there is provided an electrochemical battery which includes a polyolefin separator, a cathode and an anode, and is filled with an electrolyte. The polyolefin separator may be the separator manufactured by the method according to one exemplary embodiment as set forth above, or the separator according to the exemplary embodiment as set forth above.

In accordance with yet another exemplary embodiment of the invention, there is provided an electrochemical battery which includes a cathode, an anode, a separator, and an electrolyte, wherein the separator is a polyolefin separator having a ratio (b/a) of TD melt shrinkage (b) to MD melt shrinkage (a) of 1.2 or less as measured in accordance with TMA.

The electrochemical battery according to the present invention is not particularly limited in terms of kind and may be any typical battery known in the art.

The electrochemical battery according to the present invention may be a lithium secondary battery, such as a lithium metal secondary battery, a lithium ion secondary battery, a lithium polymer secondary battery, a lithium ion polymer secondary battery, and the like.

The electrochemical battery according to the present invention may be manufactured by any method typically used in the art.

By way of example, the electrochemical battery may be manufactured by the following method. The polyolefin separator including an organic/inorganic complex coating layer is interposed between a cathode and an anode, followed by filling the battery with an electrolyte, thereby providing an electrochemical battery.

Electrodes constituting the electrochemical battery according to the present invention may be prepared in the form of an electrode current collector with an electrode active material applied thereto using a typical method known in the art.

Among the electrode active materials used in the present invention, a cathode active material may be any cathode active material typically used in the art.

Examples of the cathode active material may include, but are not limited to, lithium manganese oxide, lithium cobalt oxide, lithium nickel oxide, lithium iron oxide, and lithium complex oxides obtained by combination thereof.

Among the electrode active materials according to the present invention, an anode active material may be any anode active material typically used in the art.

Examples of the anode active material may include lithium adsorption materials, such as a lithium metal or lithium alloy, carbon, petroleum coke, activated carbon, graphite, and other carbons, without being limited thereto.

The electrode current collectors may be any electrode current collector typically used in the art.

Examples of materials for a cathode current collector of the electrode current collectors may include a foil made of aluminum, nickel, and combinations thereof, without being limited thereto.

Examples of materials for an anode current collector of the electrode current collectors may include a foil made of copper, gold, nickel, copper alloys, and combinations thereof, without being limited thereto.

The electrolyte may be any electrolyte for electrochemical batteries typically used in the art.

The electrolyte may be an electrolyte obtained by dissolution or dissociation of a salt having a structure such as $A^+B^-$ in an organic solvent.

Examples of $A^+$ may include, but are not limited to, an alkali metal cation such as $Li^+$, $Na^+$, or $K^+$ and a cation obtained by combination thereof.

Examples of if may include, but are not limited to, an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, or $C(CF_2SO_2)_3^-$ and an anion obtained by combination thereof.

Examples of the organic solvent may include propylene carbonate (PC), ethylene carbonate (EC), diethyl carbonate (DEC), dimethyl carbonate (DMC), dipropyl carbonate (DPC), dimethyl sulfoxide (DMSO), acetonitrile, dimethoxyethane, diethoxyethane, tetrahydrofuran (THF), N-methyl-2-pyrrolidone (NMP), ethyl methyl carbonate (EMC), and γ-butyrolactone (GBL), without being limited thereto. These organic solvents may be used alone or as mixtures thereof.

Next, the present invention will be described in more detail with reference to examples, comparative examples, and experimental examples. However, it should be noted that these examples, comparative examples, and experimental examples are provided for illustration only and should not be construed in any way as limiting the invention.

EXAMPLE 1

A mixture of 25.5 wt % of high-density polyethylene having a weight average molecular weight (Mw) of 600,000 g/mol (HDPE; Mitsui Chemical) and 4.5 wt % of ultra-high molecular weight polyethylene having a weight average molecular weight (Mw) of 2,400,000 g/mol (UHMWPE; Mitsui Chemical) and 70 wt % of liquid paraffin (LP) (Kukdong Oil & Chemicals Co., Ltd.) was introduced into a twin screw extruder, followed by extrusion.

After extrusion, a gel phase obtained through a T-die was formed into a sheet using a cooling roll, and then the sheet was subjected to MD stretching at 100° C. to have an MD stretching factor of 4.5 times, followed by primary TD stretching at 110° C. to have a TD stretching factor of 7 times (Ratio of primary TD stretching factor to MD stretching factor=1.56).

After primary TD stretching, the stretched polyethylene base film was washed with methylene chloride (Samsung Fine Chemical) to extract the liquid paraffin, and dried at 30° C. for 10 seconds. Next, the dried base film was subjected to heat setting at 127° C., in which the dried base film was subjected to TD stretching to a stretching factor of 1.4 L (L: the transverse width of the separator after primary TD stretching), followed by transverse relaxation to a stretching factor of 1.1 L.

The heat set film was wound to provide a polyolefin porous separator having a thickness of 14 μm.

EXAMPLE 2

A polyolefin porous separator was prepared in the same manner as in Example 1 except that the dried base film was subjected to secondary TD stretching to a stretching factor of 1.4 L, followed by transverse relaxation to a stretching factor of 1.2 L.

EXAMPLE 3

A polyolefin porous separator was prepared in the same manner as in Example 1 except that the dried base film was subjected to secondary TD stretching to a stretching factor of 1.2 L, followed by transverse relaxation to a stretching factor of 1.0 L.

EXAMPLE 4

A polyolefin porous separator was prepared in the same manner as in Example 1 except that the dried base film was subjected to secondary TD stretching to a stretching factor of 1.1 L, followed by transverse relaxation to a stretching factor of 1.0 L.

EXAMPLE 5

A polyolefin porous separator was prepared in the same manner as in Example 1 except that the dried base film was subjected to secondary TD stretching to a stretching factor of 1.2 L, followed by transverse relaxation to a stretching factor of 1.1 L.

EXAMPLE 6

A polyolefin porous separator was prepared in the same manner as in Example 1 except that the dried base film was subjected to secondary TD stretching to a stretching factor of 1.1 L, followed by transverse relaxation to a stretching factor of 0.9 L.

COMPARATIVE EXAMPLE 1

A polyolefin porous separator was prepared in the same manner as in Example 1 except that the dried base film was subjected to secondary TD stretching to a stretching factor of 1.1 L and transverse relaxation was not performed.

In preparation of the separators of Example 1 to 6 and Comparative Example 1, the compositions of the separators, MD stretching/primary TD stretching conditions, and secondary TD stretching/heat setting conditions are shown in Table 1.

EXPERIMENTAL EXAMPLE 1

Measurement of Air Permeability of Separator

To measure air permeability of each of the separators prepared in Examples 1 to 6 and Comparative Example 1, the following experiment was conducted.

Each of the separators prepared in Examples and Comparative Example was cut into a size capable of accommodating a circle having a diameter of 1 inch or more at 10 different regions to obtain 10 specimens. Then, time for each specimen to transmit 100 cc of air was measured 5 times using an air permeability measurement instrument (Asahi Seiko Co., Ltd), followed by averaging to find air permeability.

EXPERIMENTAL EXAMPLE 2

Measurement of Puncture Strength of Separator

To measure puncture strength of each of the separators prepared in Examples 1 to 6 and Comparative Example 1, the following experiment was conducted.

Each of the separators prepared in Examples and Comparative Example was cut into a size of 50 mm×50 mm (length (MD)×width (TD)) at 10 different regions to obtain 10 specimens. Next, each of the specimens was placed over a hole having a diameter of 10 cm using a compression tester G5 (Gato Tech Co., Ltd), followed by measuring puncturing force three times for each specimen while pressing down using a probe having a diameter of 1 mm, and then averaging the obtained values.

EXPERIMENTAL EXAMPLE 3

Measurement of Tensile Strength of Separator

To measure tensile strength of each of the separators prepared in Examples 1 to 6 and Comparative Example 1, the following experiment was conducted.

Each of the separators prepared in Examples and Comparative Example was cut into a rectangular shape having a size of 10 mm×50 mm (length (MD)×width (TD)) at 10 different regions to obtain 10 specimens. Then, each of the specimens was mounted on a universal testing machine UTM (tensile tester) and gripped to have a length of 20 mm, followed by measurement of average tensile strength in the

TABLE 1

|  |  | Example 1 | Example 2 | Example 3 | Example 4 | Example 5 | Example 6 | Comparative Example 1 |
|---|---|---|---|---|---|---|---|---|
| Composition (wt %) | HDPE | 25.5 | 25.5 | 25.5 | 25.5 | 25.5 | 25.5 | 25.5 |
|  | UHMWPE | 4.5 | 4.5 | 4.5 | 4.5 | 4.5 | 4.5 | 4.5 |
|  | LP | 70 | 70 | 70 | 70 | 70 | 70 | 70 |
| MD stretching/ primary TD stretching conditions | Stretching method | two step biaxial | two step biaxial | two step biaxial | two step biaxial | two step biaxial | two step biaxial | two step biaxial |
|  | Stretching factor (MD × TD) | 4.5 × 7 | 4.5 × 7 | 4.5 × 7 | 4.5 × 7 | 4.5 × 7 | 4.5 × 7 | 4.5 × 7 |
|  | MD stretching factor/primary TD stretching factor | 1.56 | 1.56 | 1.56 | 1.56 | 1.56 | 1.56 | 1.56 |
|  | MDstretching/TD stretching temperature | 100° C./ 110° C. | 100° C./ 110° C. | 100° C./ 110° C. | 100° C./ 110° C. | 100° C./ 110° C. | 100° C./ 110° C. | 100° C./ 110° C. |
| Secondary TD stretching/TD relaxation (Heat setting) conditions | ratio of TD stretching/TD relaxation(heat setting) | 1.4→1.1 | 1.4→1.2 | 1.2→1.0 | 1.1→1.0 | 1.2→1.1 | 1.1→0.9 | 1.1 |
|  | Temperature | 127° C. | 127° C. | 127° C. | 127° C. | 127° C. | 127° C. | 127° C. | machine direction (MD) and the transverse direction (TD) while applying a pulling force to the specimen.

EXPERIMENTAL EXAMPLE 4

Measurement of Thermal Shrinkage of Separator

To measure thermal shrinkage of each of the separators prepared in Examples 1 to 6 and Comparative Example 1, the following experiment was conducted.

Each of the separators prepared in Examples and Comparative Example was cut into a size of 50 mm×50 mm (length (MD)×width (TD)) at 10 different regions to obtain 10 specimens. Then, each of the specimens was left in an oven at 105° C. for 1 hour, followed by measuring the degree of shrinkage in the MD and in the TD, and then calculating average thermal shrinkage.

EXPERIMENTAL EXAMPLE 5

Measurement of Melt Shrinkage of Separator

To measure melt shrinkage of each of the separators prepared in Examples 1 to 6 and Comparative Example 1, the following experiment was conducted.

Each of the separators prepared in Examples and Comparative Example was cut into a rectangular shape having a size of 10 mm×80 mm (length (MD)×width (TD)) at 10 different regions to obtain 10 specimens. Then, with each of the specimens mounted on a TMA apparatus, a ratio of length of the specimen subjected to melt shrinkage to initial length of the specimen was measured by measuring length variation of each specimen while heating the specimen from room temperature (about 20° C.) to about 200° C. at a temperature increase rate of 10° C./min under a load of 0.005 N, followed by averaging the obtained values to obtain melt shrinkage.

Measurement results according to Experimental Examples 1 to 5 are shown in Table 2.

stretching exhibited higher TD and MD melt shrinkage than the separators of Examples 1 to 6, and thus the ratio of TD melt shrinkage to MD melt shrinkage of the separator exceeded 1.2.

The invention claimed is:

1. A polyolefin separator, wherein the separator is a single layer and a ratio (b/a) of transverse direction (TD) melt shrinkage (b) of the separator to machine direction (MD) melt shrinkage (a) thereof is 1.2 or less, as measured in accordance with thermomechanical analysis (TMA) according to the following:
   a specimen of the polyolefin separator is cut into a rectangular shape having a size of 10 mm×80 mm (length (MD)×width (TD)) at 10 different regions to obtain 10 specimens;
   then, with each of the specimens mounted on a TMA apparatus, a ratio of length of the specimen subjected to melt shrinkage to initial length of the specimen is measured by measuring length variation of each specimen while heating the specimen from room temperature (about 20° C.) to about 200° C. at a temperature increase rate of 10° C./min under a load of 0.005 N, followed by averaging the obtained values to obtain melt shrinkage.

2. The polyolefin separator according to claim 1, wherein the separator has an MD melt shrinkage of 10% to 35%.

3. The polyolefin separator according to claim 1, wherein the separator has a TD melt shrinkage of 5% to 35%.

4. The polyolefin separator according to claim 1, wherein the separator has a tensile strength of 1,500 kgf/cm$^2$ or more both in the machine direction (MD) and in the transverse direction (TD).

5. The polyolefin separator according to claim 4, wherein the separator has a ratio (y/x) of TD tensile strength (y) to MD tensile strength(x) of 0.7 to 1.

6. The polyolefin separator according to claim 1, wherein the separator has an air permeability of 350 sec/100 cc or less.

7. The polyolefin separator according to claim 1, wherein the separator has a puncture strength of 700 gf or more.

TABLE 2

| | | Example 1 | Example 2 | Example 3 | Example 4 | Example 5 | Example 6 | Comparative Example 1 |
|---|---|---|---|---|---|---|---|---|
| Thickness (μm) | | 14 | 14 | 14 | 14 | 14 | 14 | 14 |
| Permeability (second/100 cc) | | 254 | 203 | 315 | 320 | 290 | 339 | 302 |
| Puncture strength (gf) | | 718 | 721 | 713 | 714 | 716 | 710 | 711 |
| Tensile strength (kgf/cm$^2$) | MD | 2,333 | 2,440 | 2,090 | 1,933 | 2,023 | 2,004 | 2,045 |
| | TD | 2,100 | 2,200 | 1,670 | 1,600 | 1,700 | 1,570 | 1,680 |
| | TD/MD | 0.900 | 0.902 | 0.799 | 0.828 | 0.840 | 0.783 | 0.822 |
| Thermal shrinkage (105° C., 1 hr) | MD | 3.0 | 3.0 | 3.0 | 3.0 | 3.0 | 3.0 | 3.0 |
| | TD | 0 | 0.5 | 0 | 0 | 0.5 | 0 | 0.5 |
| Melt shrinkage (%) | MD | 25 | 26 | 27 | 28 | 28 | 28 | 28 |
| | TD | 18 | 22 | 26 | 33 | 30 | 26 | 35 |
| | TD/MD | 0.72 | 0.85 | 0.96 | 1.18 | 1.07 | 0.93 | 1.25 |

Referring to Table 2, it could be seen that the separators prepared by a process including TD stretching and transverse relaxation (Examples 1 to 6) had a ratio of TD melt shrinkage to MD melt shrinkage of 1.2 or less as measured in accordance with TMA, thereby securing good thermal stability while improving tensile strength.

Conversely, the separator of Comparative Example 1 in which transverse relaxation was not performed after TD 8. The polyolefin separator according to claim 1, wherein the separator has a thermal shrinkage of less than 4% both in the machine direction and in the transverse direction after being left at 105° C. for 1 hour.

9. An electrochemical battery including a cathode, an anode, a separator, and an electrolyte,
   wherein the separator is the polyolefin separator according to claim 1.

10. The electrochemical battery according to claim 9, wherein the electrochemical battery is a lithium secondary battery.

* * * * *